INVENTORS.
ROBERT L. CARPER
JUERGEN G.A. LEIN
DONALD J. MILLER
RAYMOND J. SCHMIDLIN
JOSEPH A. VERDERBER

BY Russell L. Root
ATTORNEY.

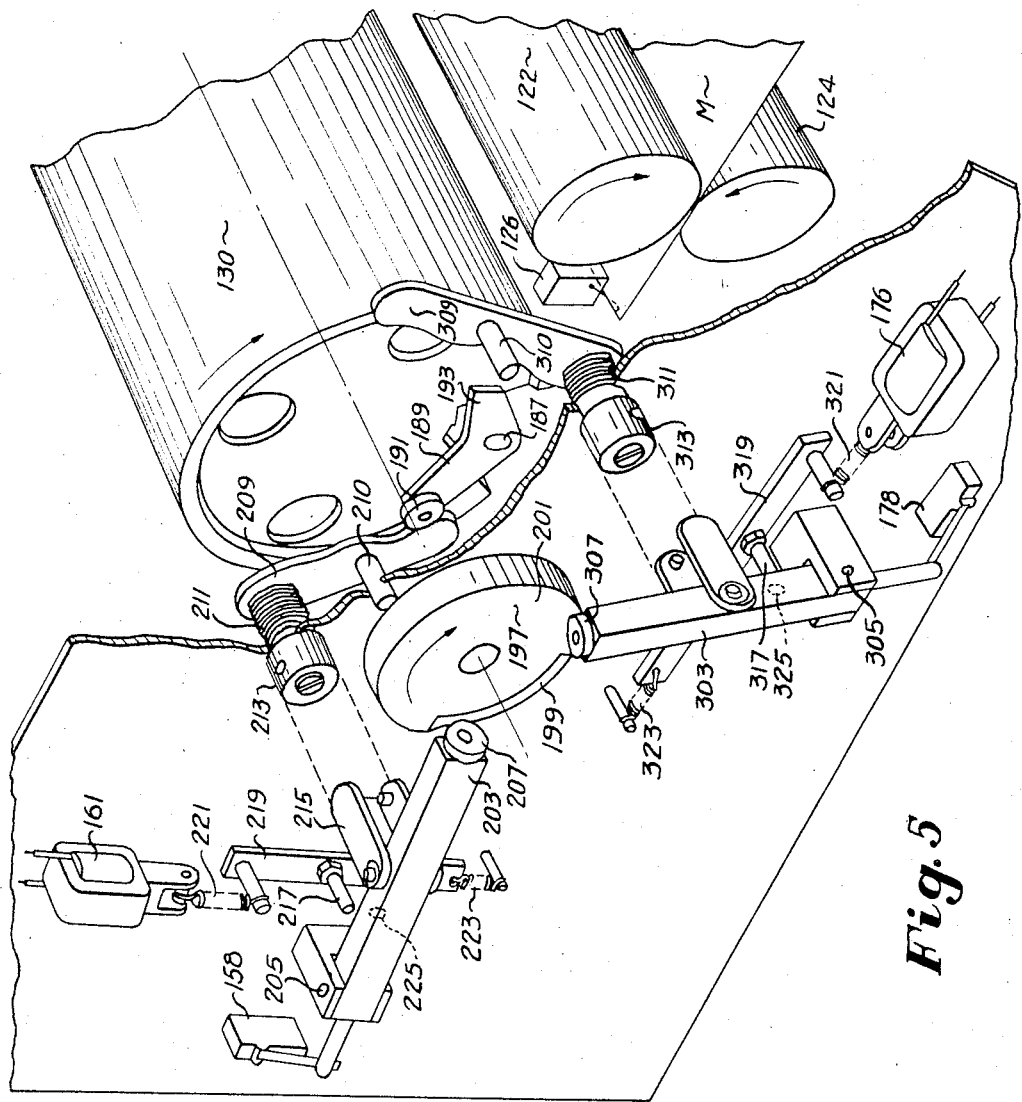

United States Patent Office 3,426,678
Patented Feb. 11, 1969

3,426,678
MASTER MAKING AND DUPLICATING MACHINE
Robert L. Carper, Eastlake, Juergen G. A. Lein, Cleveland, Donald J. Miller, Lakewood, and Raymond J. Schmidlin and Joseph A. Verderber, Lyndhurst, Ohio, assignors to Addressograph Multigraph Corporation, Cleveland, Ohio, a corporation of Delaware
Filed Jan. 25, 1966, Ser. No. 522,902
U.S. Cl. 101—132.5              10 Claims
Int. Cl. B41l *11/08;* B41m *5/20*

ABSTRACT OF THE DISCLOSURE

There is described an apparatus (and the method according to which it operates) for handling one or more original documents presented to the equipment, and rapidly producing from each original a desired number of printed duplicates. In particular the apparatus includes a master making portion which exposes a charged photoconductive sheet to a light and shadow image of the original to form a reverse reading latent electrostatic image thereon, develops the latent image thus formed on the sheet, and treats the sheet to convert the surface coating in the background areas to hydrophilic condition so that the sheet may perform as a lithographic master. The apparatus also includes an automated direct printing rotary lithographic duplicator which mechanically takes each master thus prepared, places it on the master cylinder, prints by direct contact between the master and receiving sheets, making the desired number of copies in accordance with a preset counter setting, discharges the master, and then triggers the master making section to accept and process another waiting original. Also described is a sequencing control which provides for overlapping of cycles so that whenever there is a series of originals awaiting processing, a second original may have its master prepared and brought to a position awaiting use while the master from a first original is printing copies, and a third original is at a ready location where it will be automatically picked up and fed into the master making section to have a master prepared therefrom at the instant the first master is discharged from the master cylinder of the duplicator section and the second master placed thereon.

---

This invention relates generally to the production of multiple copies from an ordinary graphic original and more particularly relates to a method and means for duplicating copies of an original by integrating photoimaging techniques with the lithographic technique to automatically and rapidly produce high quality reproductions.

Duplicating processes and equipment heretofore known, among them lithographic duplicating, afford the capability of automatically turning out high quality copies once an imaged master of the graphic original has been provided. The output of such processes is, however, limited by the amount of time required to prepare masters for use on the equipment. Photographic techniques provide a simplified way of imparting an image to a flexible material that could be made to function as a lithographic master. One form of photographic procedure which is found especially suitable in practicing the invention is the photoelectrostatic technique which involves the application of a uniform electrostatic charge in the dark to the surface of a photoelectrostatic member comprising a photoconductive layer applied to a suitable support and selectively discharging the surface by exposure to a pattern of light and shadow in accordance with the graphic subject matter on the original to be copied. Exposure to the pattern of light and shadow results in a latent electrostatic image on the surface. Typical photoelectrostatic members employ a photoconductive material, usually zinc oxide particles, dispersed in an insulating resin binder applied to a conductive support such as paper. The resulting latent electrostatic image can be developed directly on the photoconductive surface by applying an electroscopic resin powder which adheres to the portions of the exposed surface corresponding to the image on the original. In the circumstance that the electroscopic powder is positive working, it will adhere to the charged latent image areas, and in the case of reversal powders they will be attracted to the light exposed areas. The powder image is then fixed by heat, solvent vapor, pressure or such chemical treatment as to permanently bond the image to the photoconductive surface.

The imaged photoconductive members can be converted into lithographic masters by chemically treating in a known manner the background or non-image areas, i.e., those areas not protected by the powder image, to render the zinc oxide resin binder layers hydrophilic.

One of the significant problems in duplicating multiple copies of any material whether produced photographically from a graphic original or prepared by direct imaging procedures is the necessity for handling of the master during the various processing steps which may impart fingerprints and other unwanted ink receptive contamination which ultimately detract from the quality of the finished copy, and the present invention is designed to overcome this problem.

The known processes which make use of the various existing independent instrumentalities representing the independent processes involve substantial investment in individual pieces of equipment. In addition, their use will normally require a trained operator and close surveillance if quality reproduction is to be realized.

Present techniques are somewhat inefficient since the operating parameters of the individual processes or techniques determine the maximum efficiency of the overall output. Hence, the currently used lithographic printing techniques by and large are adapted to accept only right reading masters. That is to say, conventional lithographic equipment is of the offset type which calls for the transfer of the right reading image from the master to a blanket and offsetting it, hence, to a receiving sheet. The image created on the blanket requires that the operator manually remove the residual ink image, or else involves the use of complicated mechanism to clean the blanket, between runs. In addition, where electrostatic photocopying is employed, the imaging technique calls for the complete fixing of the image in accordance with the demands of photocopying systems having for their objective a finished photocopy. Finally, the independent processes require manual operation and must be processed in a very deliberate manner consecutively rather than concurrently.

It is apparent that the selection of a suitable type of master and master developing process, the handling of the various sheets, facing the sheets in the appropriate direction and the proper times, conditioning of the lithographic apparatus to printing or standby conditions, and other aspects of the procedure offer a complex of problems which does not readily resolve itself into any clear cut optimum plan for developing a simple straightforward arrangement suited to the development of a machine for use by an ordinary operator, having minimum training and under ordinary office conditions.

As compared with the recognized photoelectrostatic means and methods for preparing copies, an integrated procedure has certain special merit. While a pure photoelectrostatic process has a limited range of recognition as to such variables as color, contrast, and the like for producing acceptable copies, it has been found that a photoelectrostatic copy which is marginal or unacceptable for direct use, can be converted to a master capable of duplicating fully acceptable and usable copies, since only a minutia of ink receptive deposition on the master will act as a sufficient base for a clearly interpretable printed image.

Accordingly, one object of the present invention is to provide a new and improved method and apparatus for duplicating.

Another object is to provide a method of duplicating which is simple, efficient, and capable of turning out reproductions of consistently high quality.

Another object is to provide a duplicating apparatus that is compact, efficient, capable of consistently turning out high quality reproductions requiring no special operator training or skill and which requires nominal servicing or maintenance.

Another object is to provide a duplicating method and apparatus which is completely automatic and which is initiated by merely feeding in to be duplicated an ordinary original not prepared on a special master sheet, so that contact of the operator's hands with the surface of the master is prevented.

A further object is to provide a duplicating process that integrates the photoelectrostatic imaging techniques with the high quality printing capabilities of lithographic techniques through an activation step which permits rapid, efficient automatic operation.

A further object is to provide a duplicating process which is initiated by the insertion of an original, a feed-in station which causes a master to be fed in timed relation with said original through an imaging device, and thence through an activating zone and into a ready position for feeding into the lithographic duplicating means, and at the proper instant to concurrently begin feeding a second original and master while the first is being printed from, and then bringing a third original into ready position while the prior elements are being processed, thus giving rise to a highly efficient automated duplicator.

In achieving the foregoing objects, one embodiment of the invention for making a faithful copy of an original which is inscribed with graphic subject matter, utilizes the photoelectrostatic imaging technique. This invention, in one aspect at least, involves the discovery that this technique is characterized by relative low cost photoelectrostatic members whose photoconductive properties permit them to be easily sensitized to light so that they are photographically responsive to patterns of light and shadow, and which are further readily and speedily convertible to lithographic printing plates without operator intervention.

In one form of the instant invention the exposure of the charged photoconductive member is accomplished by contact printing at an exposure station, that is, by exposing the charged light sensitive surface through the graphic original. It will be appreciated, however, that an optical system can also be used to equal advantgae to project a light pattern onto the charged sheet, in which case the master could have graphic subject matter inscribed on both sides.

A feed-in station for receiving the graphic original and a supply source of photoconductive masters including feeding means therefor, are arranged in a generally horizontal array juxtaposed and feeding into the imaging segment of the apparatus.

The imaging segment comprises a charging means disposed in the path of the photoelectrostatic master which renders the photoconductive surface thereof sensitive to light, the contact exposure station, and a separating station where the original is separated from the master, and a developing station where the latent electrostatic image created by virtue of the light exposure through the original is developed by the application of an electroscopic resinous powder.

Means are provided for activating the photoconductive master to a lithographic master by passing said master through an activating zone which softens the resinous powder causing it to adhere to the surface of the master and then applying an aqueous solution to the imaged surface to chemically react that portion of the surface unprotected by the powder image portions. The activating zone is so designed so that the master is rapidly processed rendering it effective as a lithographic master without having to perfect it as in the circumstance of preparing the usual photocopy. The activating zone is a significant step in the duplicating process of this invention making possible the rapid, concurrent preparation of successive masters as they become available from the imaging device to the lithographic printing means. In other words, the activating zone provides the link between the imaging means and the lithographic printing means whereby the duplicating process may be integrated into one compact unit.

The activated master as it emerges from the activating zone is guided by a grid work forming a guide way to a position with its lead edge ready to be inserted into the lithographic printing means by suitable master insertion means. The insertion means comprise a pair of feed rolls which in their separated condition receive the lead edge of the master therebetween in a ready position.

When the rolls are brought into squeezing contact with the master, the master is driven into a clamping arrangement associated with the master cylinder of the lithographic printing means. Control means including a switch disposed in the entry way to the lithographic printing means senses the presence of the lead edge of the master in this ready position. The presence of the lead edge in this ready position actuates the switch means which activates the aforesaid insertion means and, when conditioned by a timing cam, activates the opening of the clamping means to occur in synchronization with the operation of the insertion means driving the master toward the cylinder with the clamp in the open position. The completion of the operation of inserting a master is detected by switch means associated, for example, with any control member which must move to effect master insertion, and a signal from this switch brings the necessary train of ink and moisture applicator rollers into contact with the master for a predetermined number of revolutions inking up the master prior to the energization of the receiving sheet feeding means. At the conclusion of the pre-inking cycle the receiving sheet feeding means is actuated, beginning the printing cycle.

In the preferred form, the lithographic printing device is of the direct printing type, that is, it transfers the ink image directly from the master to a receiving sheet fed from a receiving sheet supply source. It will be understood that this embodiment calls for a reverse reading image on the master in order that the printed copies come out right reading. Direct lithography is preferred since it eliminates the necessity of having to remove the residual ink image from the impression blanket such as when using the offset mode. In the instant invention, direct lithographic printing, that is from master to receiving sheet, provides the important properties of simplicity compactness and speed in the duplicating process.

It will be understood, of course, that so far as certain aspects of this invention are concerned, the substitution of lithographic means of the offset type may be acceptable if time for cleaning of the blanket can be permitted or a disposable blanket arrangement provided.

Counting means are provided to record the desired number of copies preset by the operator the attainment of which energizes appropriate ejection means discharging the master from the printing cylinder into a tray. Energization of the master ejection means renders the receiving sheet feeding means inoperative and concurrently therewith energizes the master insertion means and the master feeding means, the former maintaining the printing cycle and the latter maintaining the imaging cycle until such time as no more originals are fed into the feed-in station and the final master is ejected from the lithographic printing.

Many other objects and advantages of the present invention will become apparent from considering the following detailed description in conjunction with the drawings in which:

FIG. 5 is an exploded perspective of the master cylinder and associated control means.

Figures 1, 2:
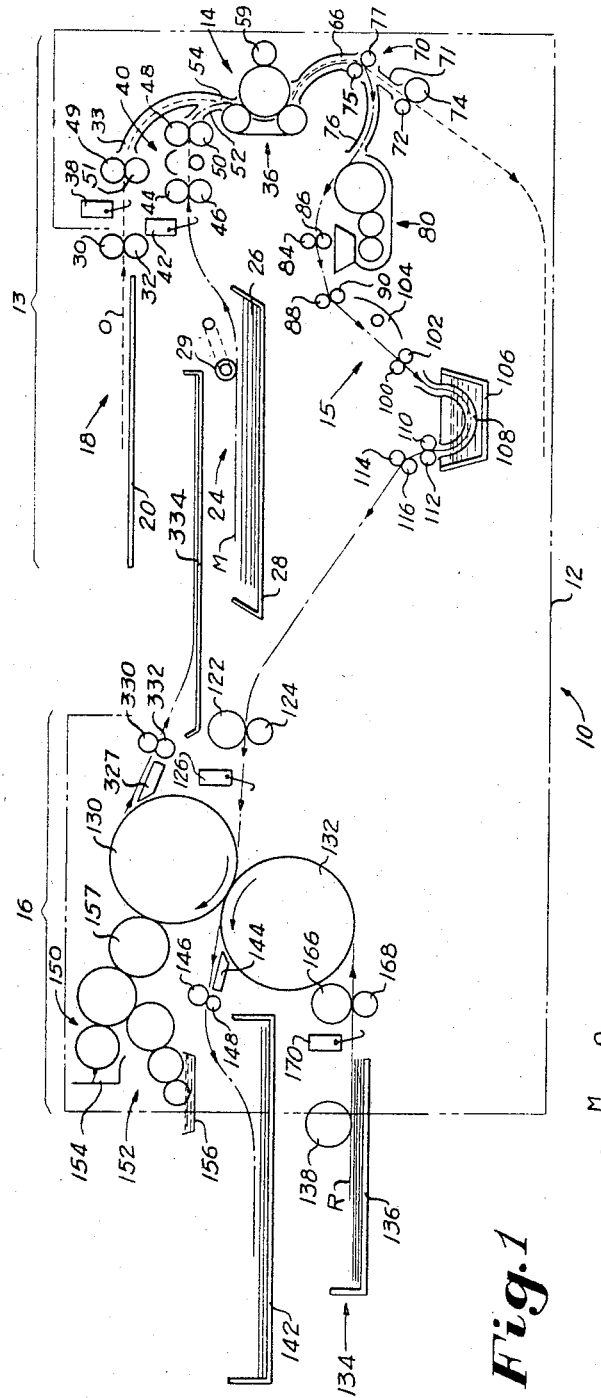
FIG. 1 is a longitudinal cross-section of apparatus in accordance with the invention, shown in diagrammatic form.
FIG. 2 is an enlarged detail of the exposure arrangement.

Referring now more specifically to FIGURES 1 and 2 of the drawings, there is illustrated a duplicating apparatus indicated generally at 10, including a housing indicated diagrammatically at 12, and arranged in accordance with the principles characterizing the procedure of the present invention.

The apparatus is shown generally in FIG. 1 and embodies basically a master making segment 13 which includes a master imaging portion 14 and an activating portion 15. As a master prepared in the master making segment 13 is completed, it is conducted through the activating portion 15 to a lithographic printing segment 16 where copies are produced by a lithographic printing technique.

The master making segment 13 includes an original feed-in station indicated generally at 18 provided near the upper portion of the housing 12 and including a generally horizontal platform 20 so positioned that an original O is directed into the imaging segment of the apparatus 14. To provide means for supplying a photoelectrostatic master M to the imaging segment of the machine 10 there is a magazine assembly indicated generally as 24 containing a stack 26 of individual masters M in a generally horizontally disposed hopper 28. A master starting roller 29 is arranged for cooperation with the next master to be fed and feeds it forward in response to the proper signal. The masters preferably are photoelectrostatic members comprising a substrate such as paper having coated thereon a photoconductive insulating layer such as zinc oxide particles dispersed in an insulating resin binder. While the feed-in platform 20 and the hopper 28 are preferably in a horizontal position for convenient handling of the original, it will be understood that other positions are also feasible.

The machine 10 is placed in operation by the feeding of the original O, face down, into the nip of a pair of rotating feed rolls 30, 32 operated by a magnetic clutch 39 (FIG. 3) and disposed at an entry way to a paper guideway 33 leading to an exposure station indicated generally at 36. A switch 38, designated an "original ready" switch, is provided at a point just after rollers 30, 32 sensing the approach of the original O and serves to control the operation of the machine in a manner to be later explained. As a master M is advanced, it is led into the charging station 40. As the forward edge of the master M supplied by the assembly 24 approaches the charging station 40, a master detecting switch 42 is operated by the lead edge of the master to place the charging station 40 into operation so that the face of the master is provided with a uniform electrostatic charge. This operation of switch 42 by the master may also be used to energize the illumination source for imaging, to control the forwarding of the original in timed relation with the master in a manner to be later described.

The master M is advanced into the charging station 40 by means of rollers 44, 46 with its photoconductive layer facing up. The charging means comprises a corona charging unit of a well-known type, although it will be understood that other means for applying an electrostatic charge may be employed if desired. A second roller set 48, 50 withdraws the charged master from the charging unit 40 into a master guideway 52. The lead edge of the original O, which is now being advanced by a pair of rollers 49, 51, and master M converge at the junction of guideways 33 and 52 which form a throat portion 54 leading to the exposure station 36. In the throat portion 54 the elements are placed in contiguous superposed position with the graphic subject matter of the original facing toward the charged and now light sensitive surface of member M forming an assemblage 56, as can be seen in FIG. 2.

Referring now more specifically to FIG. 2, the assemblage 56 is advanced into the exposure station 36 being received between the rotatively mounted transparent cylinder 58, having axially disposed therein a fixed illumination source 60, and a continuous, looped conveyor belt 63, mounted about a pair of rollers 62, 64, whose axes are parallel to the axis of rotation of the cylinder 58, the belt 63 being disposed in a manner so as to be partially wrapped around the periphery of a portion of the cylinder 58. As the assemblage enters between the cylinder 58 and the belt 63, it is urged into intimate contact with the cylinder 58 so that the belt, assemblage and cylinder move in unison with the aid of a third roller 59 spring urged against the cylinder 58. The assemblage thus passes the illumination source 60 which directs light onto the original, producing thereby a corresponding pattern of light and shadow on the surface of the master. The amount of the exposure may be governed by any one of several conventional controls, such as, for example, varying the energy input to the illumination source 60 or as by variably shading or blocking off the light source 60. The time duration of the energization of charging station and the lamp is controlled in any suitable manner, e.g., by a suitable time delay activated by the switch 42 and set to provide sufficient time for the assemblage to clear the charging and exposure areas.

As the assemblage 56 emerges from the exposure station 36, it is received into the guideway 66 which directs its movement toward the separating station 70, defined by feed rollers 75 and 77, at which point the original O is parted from the master M, the former being discharged from the master making segment 13 via a guideway 71 by the operation of a roller set 72, 74, while the master proceeds along guideway 76 to the developing station 80. In the developing station the master M has applied to the lower surface thereof which bears the latent image, electroscopic resin powder which adheres to the image portions. In the instant apparatus the well known magnetic brush type developer arrangement is employed, although other means for applying the powder may be employed.

When the master M leaves the developer station, it carries a loosely associated powder image which has been imparted in the imaging segment and thence proceeds to the activating means identified generally as 15. A series of feed roller pairs 84, 86; 88, 90; and 100, 102 convey the master from the developer past a source of heat 104 which serves merely to soften the electroscopic resin powder sufficiently to just adhere to the surface of the master M. Thereafter the master is advanced into a trough arrangement 106 where it is conducted by a guide member 108 through a treating solution by a series of rolls 110, 112, 114 and 116 for the purpose of applying the treating solution to the surface of the master M thereby converting the non-image areas, that is the areas unprotected by the adhering resin powder, to a moisture receptive condition.

At this point it may be noted that one of the important features of the instant process and equipment is the speed of operation which provides a cycle time effective for use as an office machine. It has been discovered that the master does not require a degree of completion or copy quality comparable to that which an electrostatic copy needs to be usable, but can, on the contrary, produce high quality lithographic prints under circumstances which merely fix the powder image in place in a rudimentary manner. It will be appreciated that this has a notable affect upon the processing speed, because now the master can travel past the fusing or fixing point at a high linear speed without requiring temperatures which would either damage the paper or place impractical power supply requirements on the overall machine. As an example, sheets have been processed at the rate of seven inches per second with only ½ second total time in the fixing station.

The activated master, in a somewhat moistened condition, next moves to the lithographic printing apparatus identified generally as 16 where it arrives in a ready position with its leading margin between a pair of slightly spaced insertion rolls 122, 124 which in their customary inoperative condition are maintained out of rolling contact with one another. The leading edge of the master is against a locating stop (not shown) in readiness for an insertion cycle.

The lithographic printing means 16 comprises a master cylinder 130 (FIG. 1 and FIG. 3) and a copy cylinder 132 (FIG. 1 and FIG. 3) each being equipped with clamping means and adapted to retain respectively the master M and receiving sheet R thereon during the printing operation. To provide a copy receiving medium a supply source 134 of receiving sheets R are contained in a tray 136 positioned at the lower left hand portion of the housing 12, said tray 136 being provided with receiving sheet feed means 138 rendered operative by a receiving sheet solenoid 139 (FIG. 3) for the sheets R. The receiving sheet R is clamped on to the copy cylinder 132 and passes through the area of contact between the cylinders 130 and 132, receiving thereon the ink image, and is then discharged as a finished copy into a receiving tray 142. The receiving sheet after having the ink image transferred thereto is positively lifted and guided by the blade member 144 and the roller set 146 and 148 after being unclamped from the surface of the copy cylinder 132.

A train of ink feed rollers and a train of moisture feed rollers, identified respectively as 150 and 152, supply ink and moisture from the ink reservoir 154 and moisture supply 156 to the surface of the master cylinder 130, via a form roller 157.

Figure 7:
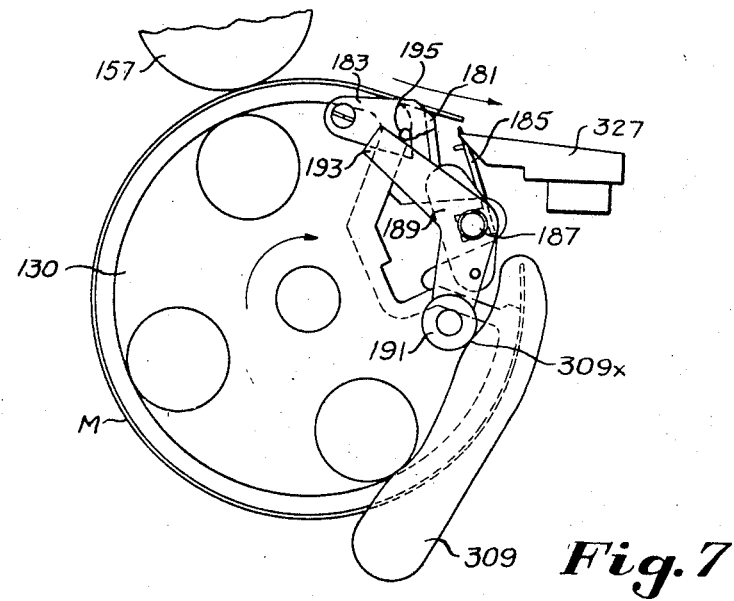
FIGS. 6 and 7 are end elevations of the master cylinder showing the master clamping and ejecting means in different positions.
Figure 6:
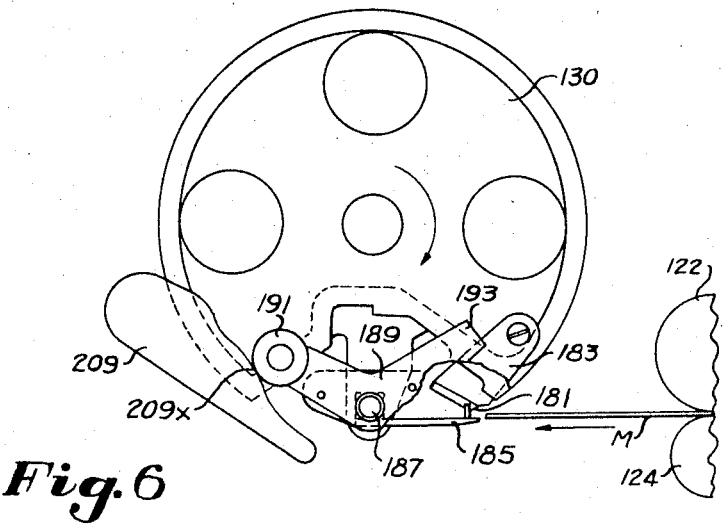

Referring especially to FIGS. 5, 6 and 7, which show in some detail the mechanism for attaching a master M to the master cylinder 130 and ejecting it therefrom, it will be seen that the cylinder 130 carries a movable anvil 181 comprising a bar having integrally connected fingers spaced along the cylinder axis, the bar being pivotally mounted on the cylinder 130 by arms 183 and normally urged to the FIG. 6 position by spring means (not shown). Spaced clamp fingers 185 are integrally connected with a rock shaft 187 rockable on the cylinder 130, and are arranged to cooperate with the fingers on the anvil 181, being urged thereagainst by other spring means (not shown). An actuating lever arm 189 is affixed to the shaft 187 and carries on one end a follower roller 191 designed to coact with an actuating edge cam to operate the clamp fingers. On its other end it carries a finger 193 cooperable with a pin 195 on the anvil arm 183 for actuating the anvil at appropriate times. The clamping structure thus far described is in general well known as will be recognized by reference to U.S. Patent 2,165,231.

FIG. 5 illustrates the parts in exploded position just as a master M is starting to be fed onto the master cylinder. It will be understood that cylinder 130 and a rotary timing cam 197 are coaxial and fastened together to rotate as a unit, the cam having an outer face comprising an active depression 199 and an extended inactive land 201. The cam is designed to cooperate with a master insertion lever 203 and a master ejection lever 303. The master insertion lever is pivoted at 205 and carries on its free end a follower roller 207 adjacent the cam 197. The lever 203 actuates a master insertion cam 209 which may be placed in or withdrawn from the path of roller 191 as the master cylinder rotates, a sliding guide pin 210 on the cam coacting with an opening in a side plate to preserve the correct orientation of the cam. The cam is urged towards active position by a spring 211, and may be withdrawn to idle position against the force of spring 211 by a linkage 213, 215 connecting it with the lever 203. Whether or not the lever 203 is allowed to follow the active depression 199 of cam 197 is governed by the position of a blocking stud 217 carried by a slide 219 actuated by a master insertion solenoid 161, acting through a strong spring 221. The slide is returned by a weaker spring 223. The end of stud 217 is designed for reception in a shallow detent recess 225 in the under surface of lever 203, and the lever carries at its opposite end an operating member for actuating a master insertion detector switch 158.

When certain parts of the machine are in condition for insertion of a master, an electrical signal energizes the master insertion solenoid 161 which attempts to move slide 219 upwardly. If the roller 207 is still on the land 201 (as it should be) it is being held high enough thereby to let the stud 217 be withdrawn from beneath the lever so that the lever can follow the depression 199 of the cam 197 when the time comes. Of course, if the energization of the solenoid 161 comes at the wrong time while roller 207 is opposite depression 199 of cam 197, stud 217 is detained by recess 225 and the shift of slide 219 does not occur at once. Under normal circumstances, however, the slide is withdrawn by the solenoid and the roller 203 then follows the cam depression 199 under the influence of spring 211, thus bringing master insertion cam 209 into the plane of roller 191 on lever 189 to bring about a master reception and clamping motion thereof. This following motion of the lever 203 actuates the switch 158 which detects the completion of the motions requisite for attachment of a master and sends a signal indicative thereof. Whenever the solenoid 161 is deenergized, of course, the stud 217 is drawn against the side of lever 203 by spring 223 until the lever is raised by the land 201 and the parts assume the initial inactive position.

Lever 303, which is related to master ejection, has a parallel control system identical with that just described in connection with the master insertion lever, and these parts are designated by reference characters which merely add 100 to those shown in the master insertion system. In this case, of course, the action is triggered by a master ejection solenoid 176 and completion is sensed by a master ejection detector switch 178.

While only one master insertion solenoid 161 has been shown, it will be understood that another such solenoid, attached in parallel so as to fire coincidentally, may be used to move the insertion rolls 122, 124 together to feed the master into operative engagement with and in timed relation to the operation of the cylinder clamp, and the "master insertion solenoid 161" will be understood to comprehend any such circuit or its equivalent.

The mechanisms described in the several immediately preceding paragraphs are related to the operations shown more particularly in FIGS. 6 and 7.

FIG. 6 shows the parts during master insertion and as they would be positioned an instant later than in the FIG. 5 view. Here the follower 191 has proceeded to the high point 209x of cam 209, so that lever 189 has rocked shaft 187 far enough to open the clamp fingers 185. These are shown about to receive the leading margin of the master M being fed into place by rollers 122, 124. As the follower proceeds down the subsequent slope of the cam 209, the clamp fingers 185 will be closed by their springs to grasp and hold the margin of master M.

FIG. 7 illustrates the action which occurs after the insertion cam 209 is withdrawn and when the ejection cam 309 is in the plane of the follower 191. The high point 309x of cam 309 is somewhat closer to the cylinder axis than point 209x, so that not only do clamp fingers 185 open, but the lever 189 is swung far enough to cause finger 193 to strike pin 195 and actuate the anvil 181 to project the same beyond the cylinder periphery. This causes the leading edge of the master to extend over and be caught by a fixed stripper 327 which is notched to interdigitate with the fingers of the bar 181, thereby guiding the used master away as it is fed between the cylinder 130 and the form roll 157. Ultimately the leading margin of the departing master is caught in the nip of feed rollers 330, 332 (FIG. 1) and fed into a receiving tray 334.

It has been stated that the copy cylinder 132 is arranged to clamp receiving sheets, and for this purpose a clamping arrangement like that shown in connection with the master cylinder may be used, except that the means for actuating the follower roller corresponding to roller 191 is merely a single, fixed, edge cam providing both a clamping motion and an ejection motion at the appropriate points druing every cycle.

Figure 3:
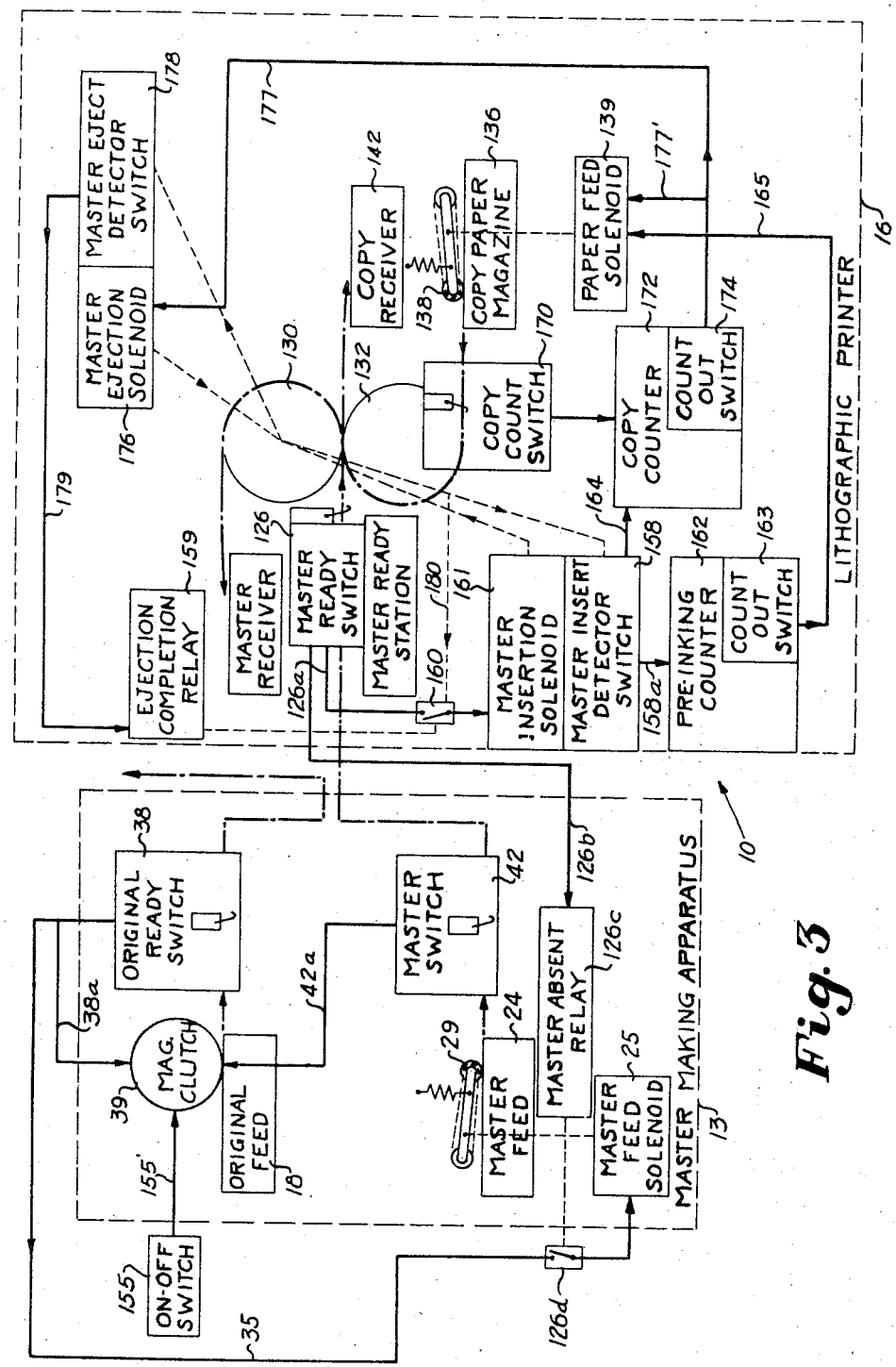
FIG. 3 is a diagrammatic representation of the electrical controls.

Referring to FIG. 3 there is shown diagrammatically the electrical control system comprising the various switches and solenoids that sequentially operate the various instrumentalities of the apparatus, and the operation of the machine may be advantageously described with reference to this view considered in connection with FIGURE 1.

The machine 10 is turned on by closing the main switch 155 which supplies power to an input line 155' immediately energizing the magnetic clutch 39 for controlling the operation of rollers 30, 32 (FIG. 1). This also energizes the drive for all of the constantly rotating elements of the machine so that the cylinders 130 and 132, the ink and moisture trains 150 and 152, form roller 157, the developing rolls at developing station 80, and feed rolls 49, 51, 44, 46, 48, 50, 62, 64, 75, 77, 84, 86, 88, 90, 100, 102, 110, 112, 114, 116, 124, 168, 146, 148, 330 and 332 are all activated by closing the main switch 155. To commence the duplicating operation the original O is fed into the rotating rollers 30, 32 until the lead edge thereof engages switch 38 deenergizing the clutch 39 via line 38a, thus holding up further movement of the original O at a predetermined point. Operating switch 38 also energizes a master feed solenoid 25 through a connecting line 35 (providing the line is suitably conditioned by switch 126d in a manner to be subsequently described) placing the master feeding assembly 24 into operation, and thereby feeding a single master from the top of the stack 26 (FIG. 1). The master M is advanced into the charging station 40 (FIG. 1). As the foreward edge of the master approaches the charging station 40, switch 42 is operated energizing the charging unit 40 so that the face of the copy sheet is provided with a uniform electrostatic charge, energizing also the illuminating source 60, and via line 42a, engaging the clutch 39 for driving rollers 30, 32 to restart the movement of the original O in such manner that the foreward edge of the master M and the lead edge of the original O proceed to the exposure station 36 in a precisely predetermined relation to one another.

Feed rollers 44, 46 (FIG. 1) advance the master M with its photoconductive layer facing up while the original O is fed in with the side containing the graphic subject matter face down. A second roller set 48, 50 withdraws the charged master from the charging unit 40 and feeds it into a master guideway 52 and places it in contiguous superposed position with the graphic subject matter of the original facing toward the charged and now light sensitive member M, forming an assemblage 56 (FIG. 2), and they are fed together through the exposure station 36. As the assemblage emerges from the station 36 it is received into the guideway 66 which directs its movement toward the separating station 70 at which time the original O is parted from the master M, the former being propelled from the master making segment 13 via guideway 71 by the roller set 72, 74; and the latter being directed along guideway 76 to the developing station 80. In the developing station the latent image bearing master M has applied thereto the electroscopic resin powder which becomes electrostatically attached to the image portions.

When the master M leaves the developer station it carries a loosely attached powder image which has been imparted by the imaging means 14, 80 and it moves thence to the activating station 15. The activating means comprises a radiant heat source 104 set to provide a sheet surface temperature below the fusion temperature of the resin powder but above room temperature, supplying sufficient heat to soften and adhere the powder to the master M. The activating means also comprises a trough arrangement 106 containing a treating solution and including a guide 108 and a train of rolls 100, 102, 110, 112, 114 and 116 for the purpose of moving the master through the treating solution to treat the master surface, affecting only those areas unprotected by the adhering resin powder to render them hydrophilic. This treatment, at the same time, provides the moisture necessary for pre-dampening the non-image areas in connection with the subsequent lithographic printing operation.

The activated master, in a somewhat moistened condition, next moves to the lithographic printing apparatus 16 where it arrives in a ready position between a pair of insertion rolls 122, 124 (FIG. 1) which in their inoperative condition are maintained out of rolling contact with one another.

Arrival of the lead edge of the master between the rollers 122 and 124 actuates the master ready switch 126 sensing the presence of the master M in position ready for insertion. This switch is connected by a line 126a with a master insertion solenoid 161. This is effective to energize the solenoid 161, however, only if the circuit has been conditioned by the operation of an ejection completion relay 159 to close a switch 160 which will be subsequently described. On the first sequence, however, such operation will have taken place and we can assume the line 126a to have been thus conditioned. Energizing solenoid 161 brings master insertion feed rolls 122 and 124 into contact, advancing the master into the clamp and at the same time opens and closes the master cylinder clamp at the proper instant to receive and clamp the master as explained in connection with FIGS. 5 and 6. As previously explained, this latter operation mechanically actuates the master insertion detection switch 158 which renders the ink and moisture rolls 150 and 152 (FIG. 1) operative and activates a pre-inking counter 162 via line 158a to determine a predetermined number of revolutions of the cylinder 130 until a sufficient ink image is built on the master M. The equipment also embodies a predetermined copy counter 172 which controls the operation of the machine in relation to the number of printed copies required. This counter is also automatically resettable to the former preset number after each count, and the master insert detector switch accomplishes this resetting function at the same time via line 164. Each revolution of the cylinder 130 advances the pre-inking counter 162 until the pre-inking cycle has been attained. This operates a countout switch 163 energizing a receiving sheet feed solenoid 139 through line connection 165, thus feeding receiving sheets R from the top of the supply stack in the tray 136 by the reeciving sheet feeding means 138. Each sheet R as it is fed by the feeding means 138 is advanced toward the drive rollers 166 and 168 and thence into the clamping means (not shown) on the copy cylinder 132. A copy count switch 170 senses each receiving sheet R fed from the stack toward the rollers 166, 168 and pulses the copy counter 172 which closes a countout switch 174 when the accumulated number of pulses equals the desired number of reproductions. In the operated position switch 174 deactivates the paper feed solenoid 139 via line 177'. At the same time it energize the master ejection solenoid 176 through the line connection 177 which in turn causes the following events to occur in sequence: ejecting the master M from the cylinder by opening the clamp jaws and projecting the anvil as previously described in connection with FIGS. 5 and 7, and then deactivating the ink and moisture train 150, 152. The ejection detection switch 178 detects the operation of the ejection mechanism and operates the ejection completion relay 159 through line 179, thus closing switch 160 and conditioning line 126a to enable the operation of the master insertion means whenever switch 126 senses the presence of a subsequent master in ready position. The mechanical motions related to insertion of a master on the cylinder 130 ( as indicated at 180) are used to open switch 160 to decondition line 126a and prevent insertion of a master until the cylinder is again ready to receive it.

Any time a master has been advanced from the ready position by the master insertion means, switch 126 is, of course, operated back to its original position. Through line 126b this operates a master absent relay 126c which closes a switch 126d to condition line 35 in such manner that feeding of a new original can trigger the feeding of a subsequent master, as previously described.

Figure 4A:
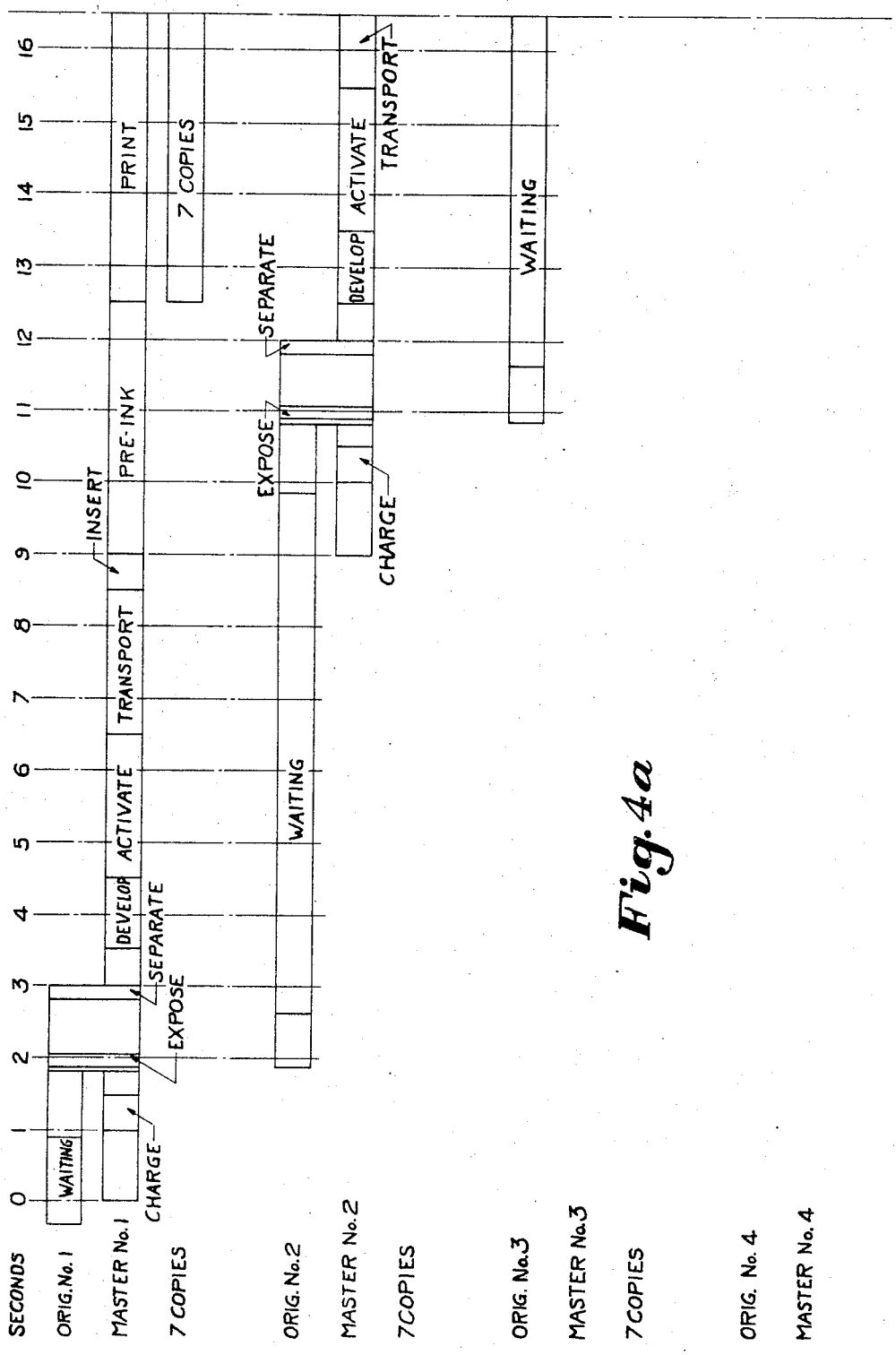
FIGS. 4a and 4b are portions of an extended timing chart illustrating the flow of the various sheet elements through the duplicating process of this invention.
Figure 4B:
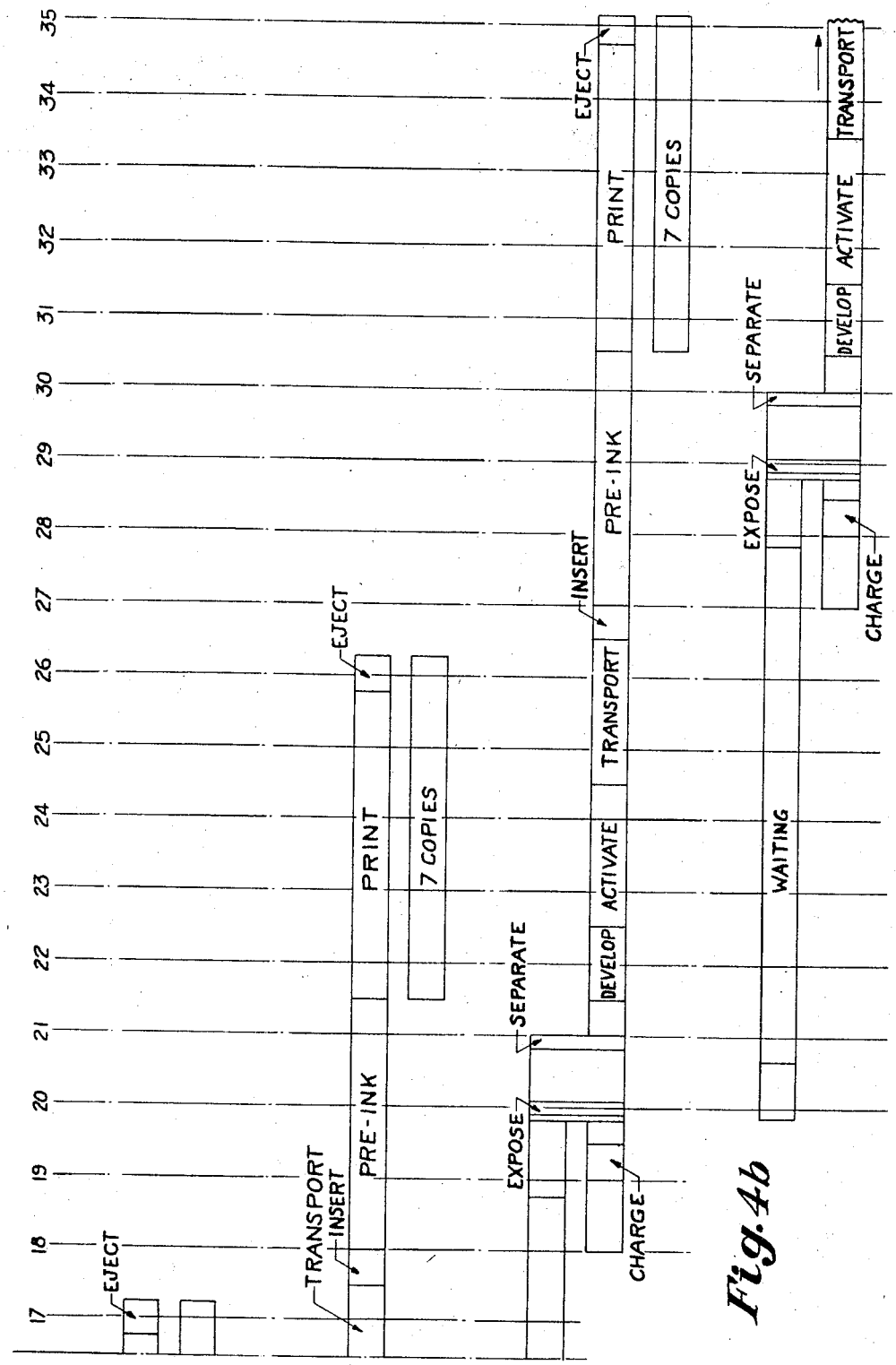

It will be apparent from the immediately preceding description of operation that it is possible with the described original to conduct a plurality of operating sequences simultaneously with different originals and masters, with a greatly improved speed of output. The nature of this advantage is perhaps best illustrated in FIGS. 4a and 4b which combine to form a chart depicting the duplicating cycle in which, for example, seven copies each are required from several different originals. As indicated by the uppermost sequence, the first original is fed into the duplicator requiring about 17 seconds before the duplicating cycle is completed. As shown in the second sequence, original No. 2 is immediately placed in position as soon as original No. 1 is taken away, and the second master is imaged and arrives at the ready station about 17½ seconds in point of time from the beginning of the original cycle. As seen in the third sequence, original No. 3 is promptly placed in position when original No. 2 is taken away, and master No. 3 is prepared and placed in ready position in about 26½ seconds. As indicated by sequence No. 4, subsequent originals can each be placed in position in turn maintaining the duplicating cycle operative. It will be observed that in about 35 seconds three masters have been processed and a total of 21 reproductions were completed. The sequence using 7 copies was selected for illustration because the master insertion, pre-inking and printing time is about equal to the time needed to get the next master into place. It will, of course, be understood that in the circumstance where a greater number of reproductions are required from each master, the waiting time for an original before it can initiate the next duplicating cycle is increased because an original cannot be fed into the cycle until the previous master is withdrawn from the ready position and starts to print copies. If fewer copies are required, the printing operation will have to wait very briefly for the succeeding master to arrive.

From the foregoing, it will be apparent that because of the arrangement which permits a series of overlapping sequences, a highly efficient duplicating process results, and the production rate of copies from masters either in small or large groups from each master, is at a level beyond that heretofore considered practical.

When these efficiencies due to overlapping sequences are superposed on the improved speed generated as a result of high speed master travel due to the recognition of the sufficiency of the rudimentary fixation technique, it will be recognized that a unique, highly advantageous process and automatic equipment for duplicating copies of an original has been provided. The importance of operating speed is combined, also, with the freedom from the necessity of operator control and the prevention of operator contact with the lithographic master which make for fool-proof procedure and equipment, acceptable in ordinary office surroundings, operable by wholly untrained people, and also capable of providing unusually high quality due to freedom from the ordinary dangers of smudges and finger prints.

In the presently preferred form of the invention set forth in the foregoing specification, imaging of the master by a contact copying procedure has been described, with the implication that the original will be somewhat translucent so that a portion of the light from the illumination source may pass through it. While in the normal situation, this terminology will fit the situation precisely, there are certain applications which may require special clarification. Reference is made, for example to originals which may be wholly opaque to electromagnetic radiation in the range of visible wave lengths, but which will transmit reasonably large amounts of such radiation in other wave length ranges. Accordingly, it will be understood that where the terms "light" and "translucent" appear in this document, they are intended to encompass, respectively, radiation of the electromagnetic type whether strictly within the visible range or not, and the property of passing a detectable portion of such radiation.

In describing the invention reference has been made to creating the master by "photographic" techniques, and of these one form of photoelectrostatic technique has been discussed in detail. It will be understood, however, that the term "photographic" is not used in a limiting sense, and as to certain aspects of the invention, any procedure which will effectively copy graphic data in a rapid fashion either en masse or in increments, usually by the use of some form of radiation, will serve equally well, and such is intended to be encompassed by such language.

While preferred embodiments of the invention have been described and illustrated, it is to be understood that these are capable of variation and modification. Accordingly, the aim in the appended claims is to cover all such variations and modifications as may fall within the true spirit of the invention.

What is claimed is:

1. The method of making multiple reproductions of each of several originals which comprises;
   (1) feeding a first original into an original path and stopping the same at a predetermined waiting point therein,
   (2) feeding a first photoresponsive master sheet having a potentially lithographic surface into a master path;
   (3) sensing the arrival of the leading edge of the first master sheet at a predetermined point in its path and starting the feeding of the original in timed relation thereto;
   (4) exposing the master to the information on the first original as both are fed through their respective paths to form a latent image on the master conforming to the information on the original;
   (5) developing the image on the first master to provide an oleophilic hydrophobic image thereon while progressing it through the master path,
   (6) treating the first master to insure its hydrophilic character in the non-image areas;
   (7) feeding the master to a ready position adjacent the master cylinder of a rotary lithographic printer and stopping the same thereat;
   (8) while the cylinder is rotating, feeding the master from the ready position to the cylinder and removably clamping the same thereto;
   (9) printing lithographic copies from said master under the control of a preset counter;
   (10) in response to the countout of said counter, stopping said printing and ejecting said master from the cylinder;
   (11) feeding a second original into the original path at some time subsequent to the feeding of the first original but prior to step 8 and stopping the same at said predetermined point;

(12) in response to step 8 while the first master is on the cylinder, feeding a second master into the master path, and performing steps corresponding to steps 3 to 10 except that they are performed relative to the same paths with the second original and the second master.

2. The method of making multiple reproductions of each of several originals which comprises;

(1) feeding a first original into an original path and stopping the same at a predetermined waiting point therein, (2) feeding a first electrostatic master sheet having a photoconductive oleophilic surface into a master path;

(3) sensing the arrival of the leading edge of the first master sheet at a predetermined point in its path and starting the feeding of the original in timed relation thereto;

(4) charging the master and exposing it to the information on the first original as both are fed through their respective paths to form a latent electrostatic image on the master conforming to the information on the original;

(5) developing the image on the first master with material for protecting the image surfaces;

(6) treating the first master to convert the non-image areas to a hydrophilic character;

(7) feeding the master to a ready position adjacent the master cylinder of a rotary lithographic printer and stopping the same thereat;

(8) while the cylinder is rotating, feeding the master from the ready position to the cylinder and removably clamping the same thereto;

(9) printing lithographic copies from said master under the control of a preset counter;

(10) in response to the countout of said counter, stopping said printing and ejecting said master from the cylinder;

(11) feeding a second original into the original path at some time subsequent to the feeding of the first original but prior to step 8 and stopping the same at said predetermined point;

(12) in response to step 8 while the first master is on the cylinder, feeding a second master into the master path, and performing steps corresponding to steps 3 to 10 except that they are performed relative to the same paths with the second original and the second master.

3. The method as set forth in claim 2 in which:

with respect to step 4 thereof, the master and original are fed into a contact relationship with the face of the original in contact with the photoconductive surface of the master to provide a latent image on the master conforming in reverse reading relationship to the information on the original, and with respect to step 9 of which the receiving sheets are fed into direct contact with the master to print direct reading copies therefrom.

4. The method of making multiple reproductions of each of several originals which comprises:

(1) feeding a first original into an original path and stopping the same at a predetermined waiting point therein;

(2) feeding a first electrostatic master sheet having a photoconductive oleophilic surface into a master path;

(3) sensing the arrival of the leading edge of the first master sheet at a predetermined point in its path and starting the feeding of the original in timed relation thereto;

(4) charging the master and exposing it to the information on the first original as both are fed through their respective paths to form a latent electrostatic image on the master conforming to the information on the original;

(5) developing the image on the first master with material for protecting the image surfaces;

(6) treating the first master to convert the non-image areas to a hydrophilic character;

(7) feeding the master to a ready position adjacent the master cylinder of a rotary lithographic printer and stopping the same thereat;

(8) while the cylinder is rotating, feeding the master from the ready position to the cylinder and removably clamping the same thereto;

(9) printing lithographic copies from said master under the control of a preset counter;

(10) in response to the countout of said counter, stopping said printing and ejecting said master from the cylinder;

(11) feeding a second original into the original path at some time subsequent to the feeding of the first original but prior to step 8 and stopping the same at said predetermined point;

(12) in response to step 8 while the first master is on the cylinder, feeding a second master into the master path, and performing steps corresponding to steps 3 to 7 except that they are performed relative to the same paths with the second original and the second master;

(13) in response to ejection of said first master from said cylinder and while the cylinder is still rotating, feeding the second master from the ready position to the cylinder and removably clamping the same thereto;

(14) feeding a third original into the original path at some time subsequent to feeding of the second original but prior to step 13, and stopping the same at said predetermined point;

(15) performing steps corresponding to steps 9 and 10, except with relation to said second master;

(16) in response to step 13, feeding a third master into the master path, and performing steps corresponding to steps 3 to 7 except that they are performed relative to the third original and the third master;

(17) feeding a fourth original into the original path at some time subsequent to feeding of the third original and stopping the same at said predetermined point; and

(18) continuing an extension of the foregoing overlapping sequences of steps with as many subsequent originals as desired.

5. The method as set forth in claim 4 in which:

with respect to step 4 thereof, the master and original are fed into a contact relationship with the face of the original in contact with the photoconductive surface of the master to provide a latent image on the master conforming in reverse reading relationship to the information on the original, and with respect to step 9 of which the receiving sheets are fed into direct contact with the master to print direct reading copies therefrom.

6. A duplicating apparatus of the type described for making multiple reproductions of originals having graphic subject matter thereon, from masters having photoconductive surfaces, to receiving sheets, comprising:

an original feed in station including original feeding means, a master supply source, master feeding means, receiving sheet supply source, receiving sheet feeding means, photoelectrostatic imagining means including developer means for applying electroscopic resin powder, a first control means responsive to the feeding of an original for actuating said master feed means to feed a first master from said supply source in timed relation with said original into said photoelectrostatic imaging means, master activating means for softening and adhering said resin powder to said phtotoconductive layer and applying an aqueous solution to said master selectively rendering the non image portions hydrophilic, lithographic printing means operable between a printing cycle and master ejection cycle, second control means responsive to the presence of said activated first master at a predetermined location for initiating the printing cycle of said printing means and actuating said receiving sheet feeding means to feed said sheets during said printing cycle, means for energizing said original feeding means and said master feeding means in response to the departure of said activated master from said predetermined location to feed a second master and original into said photoelectrostatic imaging means, count registering means, presettable to a given count, for counting the number of copies produced, and means responsive to the countout of said count registering means for initiating the ejection cycle of said lithographic printing means to eject said first master when said preset count is attained, readying said lithographic printing means to receive said second master.

7. The apparatus as set forth in claim 6 wherein the photoelectrostatic imaging means is arranged to provide on the surface of the master an image conforming in reverse reading relationship to the information on the original, wherein the lithographic printing means comprises a master cylinder for receiving and mounting the imaged master, and wherein the receiving sheet feeding means is arranged to feed the sheets into direct printing contact with the master on the cylinder.

8. A duplicating apparatus for making multiple printed copies of an original document comprising:

(1) master making means for making, on a photosensitive copy sheet which is a potential lithographic master, a master copy of an original document presented to the apparatus, including triggerable means for arranging a photosensitive master sheet and an original document sheet in an exposure relationship and exposing the former to an image of the latter, means for feeding the original document sheet out of a discharge location, and means for treating the master copy sheet thus prepared to render it an effective lithographic master and advancing it;

(2) means defining a ready position for accepting an advanced master copy sheet from the master making means and holding it in readiness for use;

(3) a lithographic printer including a master cylinder, a settable counter for counting the number of printing operations of the printer, means for taking a master copy sheet from the ready position and attaching it to a master cylinder, means for printing copies lithographically from the master copy sheet on the master cylinder, and means responsive to countout of the counter for terminating printing and ejecting the master copy sheet from the cylinder;

(4) means responsive to the ejection of a master copy sheet from the cylinder for causing the master taking and attaching means to take the next master copy sheet from the ready position and attach it to the cylinder; and (5) means jointly responsive to the presence of another original document at the arranging and exposing means and to the departure of a master copy sheet from the ready position for triggering the sheet arranging and exposing means of the master making means to initiate preparation of another master copy from another original document.

9. A duplicating apparatus of the type described for making multiple reproductions of originals having graphic subject matter thereon, from masters having a photosensitive potentially lithographic surface, to receiving sheets, comprising:

an original feed in station including original feeding means, a master supply source, master feeding means, receiving sheet supply source, receiving sheet feeding means, imaging and master activating means including developer means for masters for developing ink receptive images thereon and for insuring lithographic properties to the surfaces thereof, a first control means responsive to the feeding of an original for actuating said master feed means to feed a first master from said supply source in timed relation with said original into said imaging and master activating means, lithographic printing means operable between a printing cycle and master ejection cycle, second control means responsive to the presence of said activated first master at a predetermined location for initiating the printing cycle of said printing means and actuating said receiving sheet feeding means to feed said sheets during said printing cycle, means for energizing said original feeding means and said master feeding means in response to the departure of said activated master from said predetermined location to feed a second master and original into said imaging and master activating means, count registering means presettable to a given count for counting the number of copies produced, and means responsive to the countout of said count registering means for initiating the ejection cycle of said lithographic printing means to eject said first master when said preset count is attained, readying said lithographic printing means to receive said second master.

10. The apparatus as set forth in claim 9 wherein the imaging and master activating means is arranged to provide on the surface of the master an image conforming in reverse reading relationship to the information on the original, wherein the lithographic printing means comprises a master cylinder for receiving and mounting the imaged master, and wherein the receiving sheet feeding means is arranged to feed the sheets into direct printing contact with the master on the cylinder.

References Cited

UNITED STATES PATENTS

| | | | |
|---|---|---|---|
| 2,885,955 | 5/1959 | Vyverberg | 101—1 |
| 2,908,220 | 10/1959 | Eichenbaum et al. | 101—322 XR |
| 2,952,536 | 9/1960 | Kurz. | |
| 3,056,346 | 10/1962 | Gammeter et al. | 101—144 |

ROBERT E. PULFREY, *Primary Examiner.*

EDGAR S. BURR, *Assistant Examiner.*

U.S. Cl. X.R.

101—141, 450, 451

UNITED STATES PATENT OFFICE
CERTIFICATE OF CORRECTION

Patent No. 3,426,678  Dated February 11, 1969

Inventor(s) R. L. Carper, et al

It is certified that error appears in the above-identified patent and that said Letters Patent are hereby corrected as shown below:

Column 15, line 45, "of" should read -- to -- .

SIGNED AND SEALED
SEP 15 1970

(SEAL)
Attest:

Edward M. Fletcher, Jr.
Attesting Officer

WILLIAM E. SCHUYLER, JR.
Commissioner of Patents